Feb. 13, 1968

C. T. PALEN

3,368,969

METHOD OF MONITORING AND CONTROLLING WATER HARDNESS

Filed June 25, 1965

INVENTOR:
CLIFFORD T. PALEN
BY: *N. N. Kunitz*
HIS ATTORNEY

United States Patent Office 3,368,969
Patented Feb. 13, 1968

3,368,969
METHOD OF MONITORING AND CONTROLLING WATER HARDNESS
Clifford T. Palen, Fullerton, Calif., assignor to Shell Oil Company, New York, N.Y., a corporation of Delaware
Filed June 25, 1965, Ser. No. 466,998
4 Claims. (Cl. 210—58)

This invention relates to a method of monitoring the residual hardness in a sample of water which has been softened by means of a sequestering agent. More particularly, this invention relates to a method of analyzing a sample of water which has been softened by means of a sequestering agent to monitor simultaneously the presence of either hardness still remaining in the sample of water or an excess of the sequestering agent which preferably is an alkali metal salt of ethylene diamine tetraacetic acid, for example, the tetrasodium salt (Na$_4$EDTA)

The method has particular application in the treatment of boiler feedwater, and the use of the monitored value to control the addition of the sequestering agent in the water softening process forms a part of this invention.

The hardness of water is, for the most part, due to its calcium and magnesium content and in English-speaking countries is expressed in terms of calcium carbonate (CaCO$_3$). The total or residual hardness is the sum of the calcium hardness and the magnesium hardness which in turn are due to soluble calcium and magnesium salts, respectively.

In chemical and oil refining plants or, for that matter, in any application wherein water at elevated temperatures is run through the equipment, for example, steam boilers, water heaters, water-cooled equipment such as condensers, internal combustion engines, and other water-jacketed equipment, the control of the hardness of the circulating water is of extreme importance. This is due to the fact that as the temperature of the water increases, the solubility of some calcium and magnesium salts in the water decrease and tend to form precipitates such as calcium carbonate, calcium sulfate, magnesium hydroxide, etc., which form scales on the pipes or other surfaces with which the heated water is in contact. Such scales are highly objectionable since they can result in failure of the metal because of temperature differentials caused by the scale, and because the continual deposit of the scale reduces the effective diameter of pipelines and thus greatly reduces their carrying capacity. Moreover, in certain chemical industries and industrial applications where the water itself is used in the process or application, the presence of an abundance of hardness in the water may be objectionable. For example, where soap is to be added to the water, the calcium and magnesium ions in the water react with the ions of the fatty acids in the soap to precipitate the practically insoluble calcium and magnesium soaps, thereby resulting in the destruction and waste of the soap. Accordingly, in those applications where hardness in the water is detrimental, it has become the normal practice to treat the water prior to its use with one of the standard water softening processes, such as ion exchange or lime-soda, in order to remove most of the hardness in the water. The remaining hardness frequently is removed by means of supplementary treating chemicals. For example, in the treatment of boiler feedwater, one usual practice has been to treat the hardness remaining in the water with phosphates to convert the scale forming materials to sludge which can be drained at least partially from the boilers with the blowdown. Recently, however, another method of treating boiler feedwater to soften or to convert the hardness ions in the water to a less objectionable form has come into general use. According to this method, a sequestering or metal complexing agent is added to the stream of hard water. The sequestering agent chelates the hardness ions to form soluble chelate salts and thereby avoids the sludge formation which attends the use of phosphates for water softening purposes. One example of such a sequestering agent is the tetrasodium salt of ethylenediaminetetraacetic acid (Na$_4$EDTA). The ideal dosage of such a sequestering agent is that which chelates all of the residual hardness while providing a small trace of excess sequestering agent in the softened or treated water.

In order to monitor the hardness of the water after treatment by a sequestering agent and to insure that the proper quantity of sequestering agent has been added to the water, the hardness of the water after addition of the sequestering agent is measured from time to time and the quantity of sequestering agent, i.e., Na$_4$EDTA, varied until there is no hardness in the sample of water. The amount of sequestering agent to be added is usually based on the average water hardness as determined by occasional laboratory analyses with the result that an excess of sequestering agent is usually present in the softened water but, occasionally, significant amounts of hardness may be left in the water.

In order to provide improved control in the operation of water softening processes, a number of automatic continuous water hardness analyzers have been developed, for example the Hagen or Calgon Chemonitor H and the Milton Roy Chemalyzer. Each of these analyzers operates on the principle of blending at regular intervals, for example, three-minute intervals, a fixed volume sample of the softened water and a fixed small volume of a color reagent indicator to produce a mixture whose color is a function of the concentration of hardness ions present in the water. The resulting color is analyzed photometrically and the result is indicated on a meter which is calibrated to show a typical range of 0–10 parts per million (p.p.m.) hardness (as CaCO$_3$). The measured hardness may then be used to control the water softening process either manually or preferably by means of automatic control apparatus.

While such an arrangement may be used to insure that sufficient quantities of the sequestering agent are added to the water stream to provide a water having zero hardness, it does not indicate the quantity of excess sequestering agent in the softened water. In fact, no apparatus is presently available which will perform the function of simultaneously performing a test on the sample stream for either hardness or excess sequestering agent content. Since the cost of such sequestering agents is relatively expensive and hence the use of unnecessary excesses in the softened water should be avoided, the problem exists of providing an adequate method of controlling or minimizing the excess sequestering agent in the softened water stream.

In an effort to solve the problem of accurately controlling the quantity of sequestering agent added to the water in a water softening process in order to eliminate any excesses of the sequestering agent, it has been found that the tetrasodium salt of ethylenediamine-tetraacetic acid (Na$_4$EDTA) combines completely with hardness constituents in the water in the ratio of 10 parts per million by weight (p.p.m.w.) of a commercial solution of Na$_4$EDTA, for example, Versine 100 which is the trade name of a 38% solution of Na$_4$EDTA marketed by Dow Chemical Co., to one p.p.m.w. of hardness expressed as calcium carbonate (CaCO$_3$). Thus, water having an excess sequestering agent content of 10 parts per million may be considered as having a "negative hardness" of 1 part per million. This suggests that if 1 part per million of a water hardness producing salt, e.g., CaCl$_2$ or MgSO$_4$, were added to a water sample containing excess $Na_4EDTA$ solution in the 0–10 p.p.m. range, that the modified sample would then have a measurable hardness in the zero to one part per million range. Since this imposed additional amount of hardness residual varies inversely with the original excess $Na_4EDTA$ concentration and can be measured by any of the standard hardness analyzers available on the market, for example, the analyzers disclosed above, the measured hardness is a direct measure of the excess sequestering agent in the softened water stream and hence could be used to control accurately the water softening process to avoid undue excesses of the water softening agent.

According to applicant's invention, the above problems inherent in the prior art are eliminated by adding to the sample of the softened water to be analyzed a predetermined quantity of water hardness in the form of a water soluble salt of calcium or magnesium. The resultant sample is then analyzed by a conventional hardness analyzer to determine the excess of the sequestering agent in the softened water or, alternatively, the presence of hardness in the softened water. According to one embodiment of the invention, the hardness producing salt is added directly to a sample stream of the softened water before it enters the analyzer. According to a second and preferred embodiment of the invention, the hardness producing salt is added to the reagent utilized in the analyzer in sufficient quantities so that the desired quantity of hardness will be added to the resulting blend in the analyzer of sample and reagent.

Applicant's invention and the advantages thereof will be more clearly understood from the following detailed description when taken in conjunction with the accompanying drawings wherein.

Figure 1:
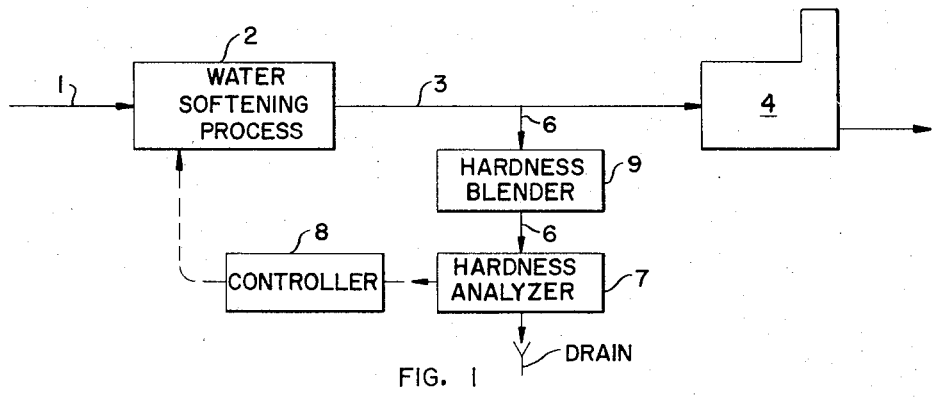
FIGURE 1 is a schematic drawing of an apparatus for carrying out the method of the invention according to one embodiment thereof.

Referring now to FIGURE 1, there is shown a pipeline 1 through which is flowing a stream of water of unknown hardness. The stream of water in the pipeline 1 is fed to a water softening process 2 wherein a water softening agent is added to the stream of water. Preferably, the water softening agent added is an alkali metal salt of ethylenediaminetetraacetic acid and, more preferably, the tetrasodium salt of ethylenediaminetetraacetic acid which is commercially available in solution form under a number of names such as Versene 100 (Dow Chemical Company), Vertan 600 (Dow Industrial Service), Sequestrene $Na_4$ (Geigy Industrial Chemicals), and Questrex 100 (Victor Chemical Company). The effluent from the water softening process 2 is fed by means of a pipeline 3 to a boiler 4 or some other means to be used as desired.

In order to control the amount of water softening agent added in the process 2, a sample stream of the effluent from the water softening process is withdrawn by means of a sample pipeline 6 and fed to a hardness analyzer 7, which may be of conventional design as indicated above, and which continuously or regularly analyzes the sample stream to produce an indication of the hardness therein. The output signal from the hardness analyzer 7 which may, for example, be an electrical signal is fed to a controller 8 which in turn controls the amount of the water softening agent added to the water in the pipeline 1 in the water softening process 2. The system thus far described is a standard method for automatically controlling any conventional water softening process.

According to applicant's invention and in order to simultaneously measure either the residual hardness in the effluent in the water softening process 2 or, alternatively, to measure the excess of the water softening agent ($Na_4EDTA$) in the effluent, a hardness blending system 9 is inserted in the sample line 6 in front of the hardness analyzer 7. This hardness blender 9 continuously or regularly inserts into the water flowing in the sample line 6 a predetermined quantity of a water hardness producing salt. The blender 9 may, for example, consist of a flow meter connected in the sample line 6 whose output signal is directed to a controller for regulating the position of a blending valve connected in the line 6, thereby controlling the addition of a solution of a water hardness producing salt.

The quantity of the water hardness producing salt, such as calcium chloride or magnesium sulfate, which is added to the sample stream 6 by the hardness blender 9 is dependent on the particular ratio of the combination between the hardness ions in the water and the particular water softening agent utilized, and is chosen such that the hardness indication produced by the analyzer 7 may easily be related to the quantity of excess sequestering agent found in the effluent from the water softening process 2. Moreover, the quantity of water hardness added to the sample stream 6 should be such as to be within the range that the analyzer can indicate accurately and should produce a hardness indication somewhere between the extremities of the particular measuring scale used on the analyzer. For example, as indicated above, it has been found that the tetrasodium salt of ethylene diaminetetraacetic acid combines completely with hardness constituents in water in the ratio of 10 parts per million of a commercial solution of $Na_4EDTA$, i.e. Versene 100, to 1 part per million hardness measured as calcium carbonate. Thus, if 1 part per million of a hardness producing salt is added to the sample stream 6 by the blender 9, an indicated hardness of 1 p.p.m. or greater by the analyzer 7 would indicate no excess of $Na_4EDTA$ in the sample stream 6 while an indicated hardness of zero parts per million would represent 10 or greater parts per million of $Na_4EDTA$ solution with any intermediate readings being inversely related to the original Versene 100 concentration. Of course, any indications greater than 1 part per million of hardness would indicate that excess hardness originally existed in the sample stream 6. Since the conventional hardness analyzers of the type indicated above, normally have scales calibrated to show 0 to 10 parts per million of hardness, the addition of 1 part per million of hardness in order to produce the desired indication would be readily determinable. The actual relationship existing between the scale reading of the analyzers and the actual concentration of Versene 100 in the effluent from the water softening process 2 are indicated in the following table and illustrated in FIGURE 3:

| Scale Reading of Analyzer, p.p.m. Hardness | Actual Concentration | |
| --- | --- | --- |
| | p.p.m. Versene 100 | p.p.m. Hardness |
| 0.0 | 10.0 | 0.0 |
| 0.5 | 5.0 | 0.0 |
| 0.9 | 1.0 | 0.0 |
| 1.0 | 0.0 | 0.0 |
| 2.0 | 0.0 | 1.0 |
| 5.0 | 0.0 | 4.0 |
| 10.0 | 0.0 | 9.0 |

Figure 2:
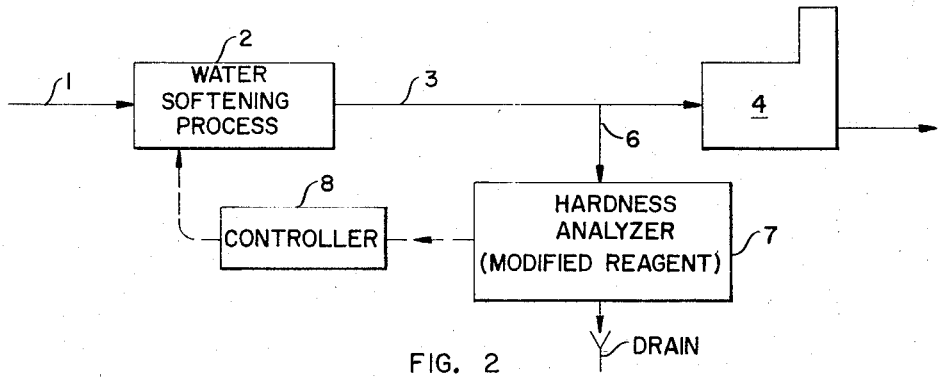
FIGURE 2 is a schematic drawing of an apparatus for carrying out the method according to the preferred embodiment of the invention.

Although the method of adding the predetermined quantity of the hardness producing salt to the sample stream 6 illustrated in FIGURE 1 appears to operate satisfactorily, problems arise because of the necessity of continuously accurately adding very small quantities of a hardness producing salt to the sample stream 6. The addition of such small quantities is very difficult to accurately control and, moreover, requires the use of very sensitive, accurate and expensive equipment. In order to overcome these problems, preferably the water hardness producing salt is added to the analyzed sample by a simple modification of the analyzer reagent. As indicated in FIGURE 2, such a system eliminates the need for the hardness blender 9 and results in the control system for the water softening process 2 being identical to that conventionally used.

According to the preferred embodiment of the invention, the desired quantity of the water hardness producing salt is added directly to the reagent utilized in the analyzer. The quantity of water hardness producing salt added to the reagent should be such that after the normal blending operation of the sample stream and the reagent in the analyzer the desired resultant quantity of hardness has been added to the sample of water. Since the volume of the sample of the water in the pipeline 6 which is withdrawn by the analyzer, and the volume of the reagent added to the sample may be different for various models and manufacturers of hardness analyzers, the particular amount of the hardness producing salt added to the reagent must be proportioned to the particular analyzer being used. the particular amount of hardness which it is desired to add to the sample of water, and the ratio with which the particular sequestering agent utilized in the water softening process combines with the hardness ions in the water.

Figure 3:
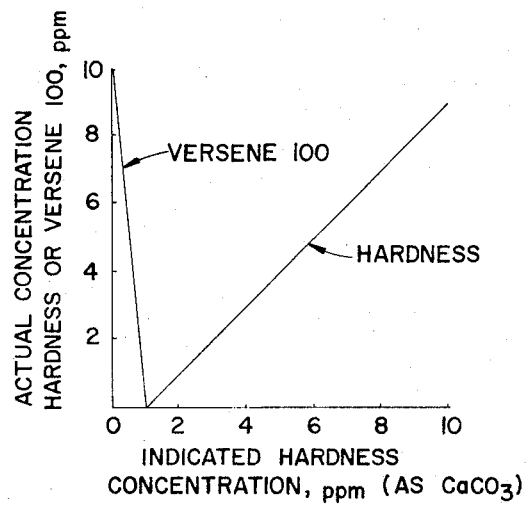
FIGURE 3 is a graph showing the relationship between the indicated measured hardness after the addition of the predetermined quantity of hardness producing salt and the actual value of the hardness of excess sequestering agent in the sample.

The following is an example of a modification of the standard reagent No. III–C used in the Milton Roy Chemalyzer for indicating water hardness. The Milton Roy Chemalyzer mixes a solution for analysis in the ratio of 0.7 ml. of reagent indicator to 22 ml. of water sample. Based on this ratio and desiring to add 1 part per million of hardness as $CaCO_3$ to the water sample for the purpose of detecting excess tetrasodium ethylenediaminetetraacetic acid, the quantity of hardness salt required to be added to the reagent would be 31.43 mg. per liter (as $CaCO_3$). This modification of the reagent composition again changes the instrument range as indicated in FIGURE 3 and in the chart above to represent 10–0 p.p.m.'s of $Na_4EDTA$ solution, and 0–9 p.p.m. water hardness.

Obviously, various modifications of the invention are possible in light of the above teachings without departing from the spirit of the invention. It is, therefore, to be understood that the invention is not limited to the particular form illustrated, but is capable of embodiment in other forms within the scope of the claims.

I claim as my invention:

1. In a method for determining the residual hardness of a sample of water which has been softened by blending with an alkali metal salt of ethylenediaminetetraacetic acid, wherein the known volume sample of the softened water is blended with a known volume of a color reagent and the resulting color of the blend measured is an indication of the residual hardness, the improvement comprising:
    adding a predetermined quantity of water hardness to the water sample prior to the measurement, whereby a hardness measurement above the added amount of hardness indicates the residual hardness of the water and a hardness measurement below the added amount indicates an excess of the alkali metal salt of ethylenediaminetetraacetic acid.

2. The method of claim 1 wherein the alkali metal salt used is the tetrasodium salt of ethylenediaminetetraacetic acid and wherein the predetermined quantity of hardness added to the sample is 1 part per million by weight measured as calcium carbonate.

3. In a water softening process utilizing an ion sequestering agent as the water softening agent, the method of continuously controlling the addition of the water softening agent to the stream of hard water comprising:
    continuously withdrawing a sample stream from the softened water effluent from said water softening process;
    adding a predetermined quantity of water hardness to said sample stream;
    measuring the residual hardness of said sample stream;
    utilizing the measured value of the residual hardness of said sample stream to control the addition of the water softening agent to the stream of hard water to cause the measured value of the hardness of said sample stream to correspond to the hardness produced in the water by the added quantity of a water hardness;
    increasing the quantity of water softening agent added whenever the measured hardness is above that corresponding to the added quantity of water hardness indicating the presence of hardness in the effluent from the water softening process; and
    decreasing the quantity of water softening agent added whenever the measured hardness is below that corresponding to the added quantity of water hardness indicating an excess of water softening agent in the water softening process effluent.

4. In a water softening process utilizing an alkali metal salt of ethylenediaminetetraacetic acid as the water softening agent, the method of continuously controlling the addition of the water softening agent to the stream of hard water comprising:
    continuously withdrawing a sample stream from the softened water effluent from said water softening process;
    adding a predetermined quantity of water hardness to said sample stream;
    measuring the residual hardness of said sample stream;
    utilizing the measured value of the residual hardness of said sample stream to control the addition of the water softening agent to the stream of hard water to cause the measured value of the hardness of said sample stream to correspond to the hardness produced in the water by the added quantity of a water hardness;
    increasing the quantity of water softening agent added whenever the measured hardness is above that corresponding to the added quantity of water hardness indicating the presence of hardness in the effluent from the water softening process; and
    decreasing the quantity of water softening agent added whenever the measured hardness is below that corresponding to the added quantity of water hardness indicating an excess of water softening agent in the water softening process effluent.

References Cited

UNITED STATES PATENTS 3,235,324   2/1966   Merriman _____ 210—58 X

OTHER REFERENCES

Botha, G. R. et al.: The Versenate Method etc., Journal of the Institution of Water Engineers, vol. 6, October 1952, pp. 459–462.

MICHAEL E. ROGERS, *Primary Examiner.*